(12) United States Patent
Franzen

(10) Patent No.: US 12,349,613 B2
(45) Date of Patent: Jul. 8, 2025

(54) INTEGRATED PTO SHAFT AND IMPLEMENT SUPPORT ASSEMBLY

(71) Applicant: DEERE & COMPANY, Moline, IL (US)

(72) Inventor: Devin M. Franzen, Altoona, IA (US)

(73) Assignee: DEERE & COMPANY, Moline, IL (US)

( * ) Notice: Subject to any disclaimer, the term of this patent is extended or adjusted under 35 U.S.C. 154(b) by 972 days.

(21) Appl. No.: 17/447,321

(22) Filed: Sep. 10, 2021

(65) Prior Publication Data

US 2023/0082908 A1 Mar. 16, 2023

(51) Int. Cl.
| | | |
|---|---|---|
| *A01B 59/00* | (2006.01) | |
| *A01B 59/04* | (2006.01) | |
| *A01B 59/042* | (2006.01) | |
| *A01B 71/06* | (2006.01) | |
| *B60D 1/54* | (2006.01) | |
| *B60D 1/66* | (2006.01) | |

(52) U.S. Cl.
CPC ............ *A01B 59/002* (2013.01); *A01B 59/04* (2013.01); *A01B 59/042* (2013.01); *A01B 71/06* (2013.01); *B60D 1/54* (2013.01); *B60D 1/66* (2013.01)

(58) Field of Classification Search
CPC .................................................... A01B 71/06
See application file for complete search history.

(56) References Cited

U.S. PATENT DOCUMENTS

| | | | | |
|---|---|---|---|---|
| 4,525,987 A | * | 7/1985 | Werner .................. | F16H 3/001 56/2 |
| 5,522,208 A | * | 6/1996 | Wattron ............... | A01B 71/066 280/492 |
| 5,528,886 A | * | 6/1996 | Esau ..................... | A01B 59/042 56/DIG. 14 |
| 5,706,901 A | * | 1/1998 | Walters ................ | A01B 71/066 180/53.1 |
| 7,862,068 B2 | * | 1/2011 | Schlesser ............. | A01B 59/042 180/53.3 |

(Continued)

FOREIGN PATENT DOCUMENTS

EP 3395134 A1 10/2018

OTHER PUBLICATIONS

Extended European Search Report and Written Opinion issued in European Patent Application No. 22194015.8, dated Feb. 3, 2023, in 10 pages.

*Primary Examiner* — Valentin Neacsu
*Assistant Examiner* — Hosam Shabara

(57) ABSTRACT

A support assembly for a trailered implement includes an implement support link that is moveable between an implement support position and a stowed position, and a shaft support link that is coupled to the implement support link via an intermediate link. The shaft support link is moveable between a first support position and a second support position. When the implement support link is disposed in the implement support position, the shaft support link may be disposed in the first support position to support and position the rotatable shaft at a first height relative to a ground surface. When the implement support link is disposed in the stowed position, the shaft support link may be disposed in the second support position to support and position the rotatable shaft at a second, lower height relative to the ground surface.

23 Claims, 6 Drawing Sheets

(56) References Cited

U.S. PATENT DOCUMENTS

| | | | | |
|---|---|---|---|---|
| 8,256,198 | B2* | 9/2012 | Thompson | A01D 34/661 |
| | | | | 180/53.3 |
| 8,469,386 | B2* | 6/2013 | Clark | A01B 71/066 |
| | | | | 172/450 |
| 8,764,042 | B2 | 7/2014 | Afting | |
| 9,480,198 | B2* | 11/2016 | Treffer | A01B 71/06 |
| 10,710,421 | B2* | 7/2020 | De Craemer | B60D 1/02 |
| 11,425,853 | B2* | 8/2022 | Guiet | A01B 59/042 |
| 11,997,938 | B2* | 6/2024 | Grass | A01B 59/042 |
| 12,207,576 | B2* | 1/2025 | Malone | A01B 59/043 |
| 2005/0161905 | A1* | 7/2005 | Chalancon | A01B 59/042 |
| | | | | 280/494 |
| 2009/0057516 | A1 | 3/2009 | Schlesser et al. | |
| 2012/0151892 | A1 | 6/2012 | Clark et al. | |

\* cited by examiner

INTEGRATED PTO SHAFT AND IMPLEMENT SUPPORT ASSEMBLY

TECHNICAL FIELD

The disclosure generally relates to trailered implement and a support assembly for the trailered implement for supporting the implement and a rotating shaft of the trailered implement when the trailered implement is not connected to a tow vehicle.

BACKGROUND

Trailered implements may include a jack or a stand for supporting a forward end of the trailered implement when the trailered implement is not attached to a tow vehicle. The jack may support the forward end of the trailered implement in a position that enables easy and/or convenient attachment to the tow vehicle.

Some trailered implements, such as but not limited to agricultural implements, may include a rotating shaft that extends between and interconnects the tow vehicle and the trailered implement. The rotating shaft is commonly referred to as a Power Take Off (PTO) shaft. The PTO shaft transmits a rotational output from the tow vehicle to the trailered implement to operate or drive various features of the trailered implement. When connecting the trailered implement to the tow vehicle, the PTO shaft must also be attached to an output of the tow vehicle. It is desirable to keep a forward end of the PTO shaft off of a ground surface when the trailered implement is not attached to the tow vehicle.

SUMMARY

A support assembly for a trailered implement is provided. The trailered implement includes a tongue configured for attachment to a tow vehicle, and a rotatable shaft positioned vertically below the tongue and configured for transmitting rotation from the tow vehicle to the trailered implement. The support assembly includes an implement support link that is moveable between an implement support position and a stowed position, and a shaft support link that is coupled to the implement support link. The shaft support link is moveable between a first support position and a second support position. When the implement support link is disposed in the implement support position, the shaft support link may be disposed in the first support position to support and position the rotatable shaft at a first height relative to a ground surface. When the implement support link is disposed in the stowed position, the shaft support link may be disposed in the second support position.

In one aspect of the disclosure, when the shaft support link is disposed in the second support position, the shaft support link is configured to support and position the rotatable shaft at a second height relative to the ground surface. The first height of the rotatable shaft may include a higher elevation relative to the ground surface than the second height of the rotatable shaft.

In one aspect of the disclosure, the support assembly may include an attachment link that is configured for attachment to the tongue of the trailered implement. The attachment link may include an independent assembly that is attached to the tongue, or may be integrally formed with the tongue. The implement support link may be rotatably attached to the attachment link for rotation, between the stowed position and the implement support position, about an implement support axis. The shaft support link may be rotatably attached to the attachment link for rotation, between the first support position and the second support position, about a shaft support axis.

In one aspect of the disclosure, the support assembly may include an intermediate link. The intermediate link interconnects the implement support link and the shaft support link. The intermediate link may be rotatably attached to the implement support link for rotation about a rotation axis of the intermediate link.

In one aspect of the disclosure, the shaft support link may define an elongated slot. The elongated slot extends along a longitudinal length of the shaft support link, between a forward end of the elongated slot and a rearward end of the elongated slot. The intermediate link includes a slidable fastener that is moveable within the elongated slot, and connects the intermediate link and shaft support link. The slidable fastener may include a pin or shaft that extends through the elongated slot, and which is slidable within the elongated slot along a length of the elongated slot.

In one aspect of the disclosure, the elongated slot may include a notch section that is disposed proximate the rearward end of the elongated slot. The notch section is shaped to engage the slidable fastener in interlocking engagement to secure the shaft support link in the first support position relative to the implement support link when the implement support link is disposed in the implement support position. The shape of the notch section may include a generally convex shape extending upward into an upper wall or edge of the elongated slot.

In one aspect of the disclosure, the support assembly may include a latch. The latch is moveable between a first latch position and a second latch position. When the latch is disposed in the first latch position, the latch is configured to secure the implement support link relative to the tongue in the implement support position. When the latch is disposed in the second latch position, the latch is configured to secure the implement support link relative to the tongue in the stowed position.

In one aspect of the disclosure, the shaft support link may include a recess arranged transverse to a longitudinal length of the tongue. The recess may include a shape that is configured to receive the rotatable shaft and resist lateral movement of the rotating shaft in a direction transverse to the longitudinal length of the tongue.

In one implementation of the disclosure, the rotatable shaft may include a Power Take Off (PTO) shaft that is configured for attachment to an output of the tow vehicle, and to transmit rotation from the output of the tow vehicle to one or more rotating elements of the trailered implement.

A trailered implement is also provided. The trailered implement includes a frame supporting at least one ground engaging element, and a tongue attached to the frame. The tongue is configured for attachment to a vehicle. A rotatable shaft is positioned vertically below the tongue and is operable to transmit a rotational input from the vehicle. The tongue includes an attachment link. An implement support link is rotatably attached to the attachment link for rotational movement, between an implement support position and a stowed position, about an implement support axis. A shaft support link is rotatably attached to the attachment link for rotational movement, between a first support position and a second support position, about a shaft support axis. When the implement support link is disposed in the implement support position, the shaft support link is positionable in the first support position to support and position the rotatable shaft at a first height relative to a ground surface. When the implement support link is disposed in the stowed position, the shaft support link is positionable in the second support position to support and position the rotatable shaft at a second height relative to the ground surface.

In one aspect of the disclosure, the first height includes a higher elevation relative to the ground surface than the second height.

In one aspect of the disclosure, the trailered implement includes an intermediate link. The intermediate link interconnects the implement support link and the shaft support link. The intermediate link is rotatably attached to the implement support link for rotation about a rotation axis of the intermediate link.

In one aspect of the disclosure, the shaft support link defines an elongated slot. The elongated slot extends along a longitudinal length of the shaft support link, between a forward end of the elongated slot and a rearward end of the elongated slot. The intermediate link includes a slidable fastener moveable within the elongated slot. The slidable fastener may include a pin or a shaft that extends through the elongated slot, and connects the intermediate link and the shaft support link.

In one aspect of the disclosure, the elongated slot may include a notch section that is disposed proximate the rearward end of the elongated slot. The notch section may be shaped to engage the slidable fastener in interlocking engagement to secure the shaft support link in the first support position when the implement support link is disposed in the implement support position.

In one aspect of the disclosure, when the implement support link is disposed in the implement support position, the shaft support link may be positionable in a third position. The third position of the shaft support link includes the shaft support link being angled downward and away from the rotatable shaft with the slidable fastener positioned proximate the forward end of the elongated slot. The third position arranges the shaft support link out of the way of the rotatable shaft, better allowing maintenance and/or replacement thereof.

In one aspect of the disclosure, the trailered implement may include a latch. The latch is moveable between a first latch position and a second latch position. When the latch is disposed in the first latch position, the latch is configured to secure the implement support link relative to the tongue in the implement support position. When the latch is disposed in the second latch position, the latch is configured to secure the implement support link relative to the tongue in the stowed position.

In one implementation of the disclosure, the attachment link defines a first attachment bore and the implement support link includes a first support bore. The first attachment bore and the first support bore are aligned with each other when the implement support link is disposed in the implement support position. The latch may include a pin, and is simultaneously positionable within and extends through the first attachment bore and the first support bore to secure the implement support link relative to the tongue in the implement support position.

In one implementation of the disclosure, the attachment link defines a second attachment bore and the implement support link includes a second support bore. The second attachment bore and the second support bore are aligned with each other when the implement support link is disposed in the stowed position. The latch may include a pin, and is simultaneously positionable within and extends through the second attachment bore and the second support bore to secure the implement support relative to the tongue in the stowed position.

In one aspect of the disclosure, the implement support link may include a first portion and a second portion. The second portion may include a foot that is configured for engaging the ground surface. The first portion and the second portion form an angle therebetween to position the foot nearer the rotatable shaft when the implement support link is positioned in the stowed position.

Accordingly, the support assembly of the trailered implement described herein provides the implement support link that is operable for supporting the forward end of the trailered implement when the trailered implement is not attached to the tow vehicle, as well as the shaft support link that is operable to support the rotatable shaft. The implement support link and the shaft support link are coupled and operate together, to provide a convenient and efficient system for supporting both the trailered implement and the rotatable shaft. Additionally, the shaft support link is operable to support the rotatable shaft in the second support position, even when the implement support link is disposed in the stowed position, such as when the tongue is attached to the tow vehicle. Notable, the second support position of the shaft support link is lower than the first support position of the shaft support link, thereby providing clearance between the rotatable shaft and the shaft support link during operation.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the Figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
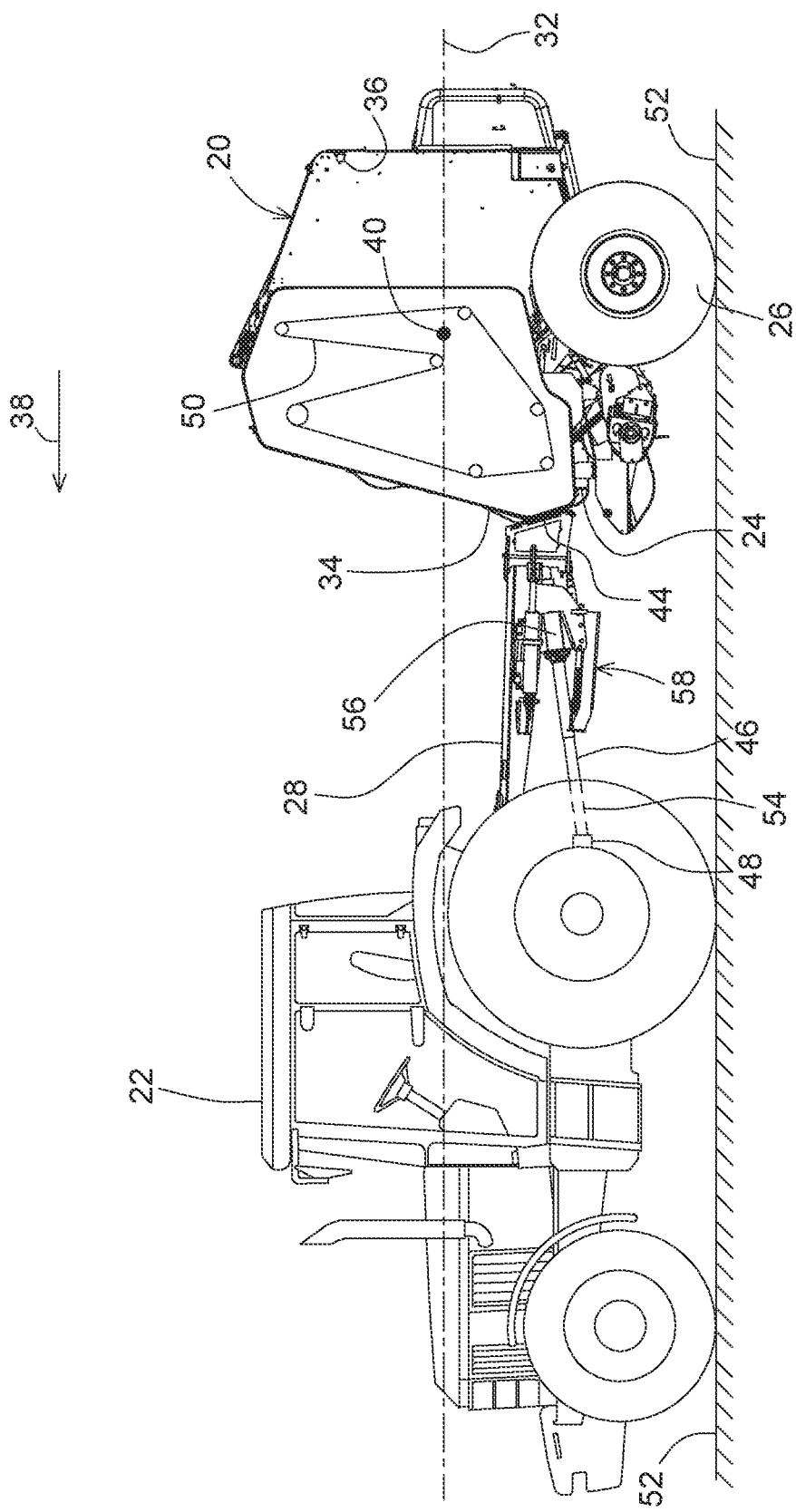
FIG. 1 is a schematic side cross sectional view of a trailered implement.

Referring to the Figures, wherein like numerals indicate like parts throughout the several views, a trailered implement is generally shown at 20 in FIG. 1. Referring to FIG. 1, the trailered implement 20 is configured to be drawn behind a tow vehicle 22. The tow vehicle 22 may include, but is not limited to, an agricultural tractor, a truck, a crawler, etc.

The trailered implement 20 may be implemented in different configurations to provide different functions. For example, the trailed implement shown in the Figures and described herein, is configured as a round baler for collecting crop material and forming the crop material into a bale having a cylindrical shape. However, it should be appreciated that the trailered implement 20 may be configured differently than the example implementation. For example, the trailered implement 20 may alternatively be configured as a trailer, a large square baler, a mower, a mower-conditioner, a sprayer, a spreader, etc. As such the scope of the disclosure is not limited to the example implementation of the round baler shown in the Figures and described herein.

The trailered implement 20 includes a frame 24. The frame 24 supports various different components of the trailered implement 20. The frame 24 may include a number of different components, including but not limited to rails, cross members, braces, wall panels, brackets, etc. The specific shape, features, construction, etc., of the frame 24 are not pertinent to the teachings of this disclosure, are dependent upon the specific application of the trailered implement 20, are understood by those skilled in the art, and are therefore not described in greater detail herein.

The frame 24 supports at least one ground engaging element 26. The ground engaging element 26 may include, but is not limited to, one or more tires, one or more tracks, one or more skids, etc. The trailered implement 20 may include any number of ground engaging elements 26. For example, the implementation of the trailered implement 20 shown in the Figures includes two ground engaging elements 26. However, it should be appreciated that the trailered implement 20 may include more than the two ground engaging elements 26 shown in the Figures and described herein. The specific construction, type, attachment, etc. of the ground engaging elements 26 are not pertinent to the teachings of this disclosure, are understood by those skilled in the art, and are therefore not described in greater detail herein.

As noted above, the trailered implement 20 is configured for attachment to the tow vehicle 22. The trailered implement 20 may be connected to the tow vehicle 22 in any suitable manner. The specific manner in which the trailered implement 20 is connected to the tow vehicle 22 may depend upon the specific application and/or implementation of the trailered implement 20. In the example implementation shown in the Figures and described herein, the trailered implement 20 includes a tongue 28 that is attached to the frame 24, with the tongue 28 configured for attachment to the tow vehicle 22. However, it should be appreciated that in other implementations, the trailered implement 20 may not include the tongue 28, and may be connected to the tow vehicle 22 in some other manner not shown or described herein.

In the example implementation shown in the Figures and described herein, the tongue 28 may include a hitch arrangement 30 that attaches the tongue 28 to the tow vehicle 22. For example, the hitch arrangement 30 may be configured to attach, either indirectly or directly, to a tow bar or a pair of support arms of an agricultural tractor, i.e., a two-point hitch system. In other implementations, the tow vehicle 22 may include a hitch connector that is attached to a three-point hitch system of the tow vehicle 22, and to which the hitch arrangement 30 on the tongue 28 is attached.

Figure 2:
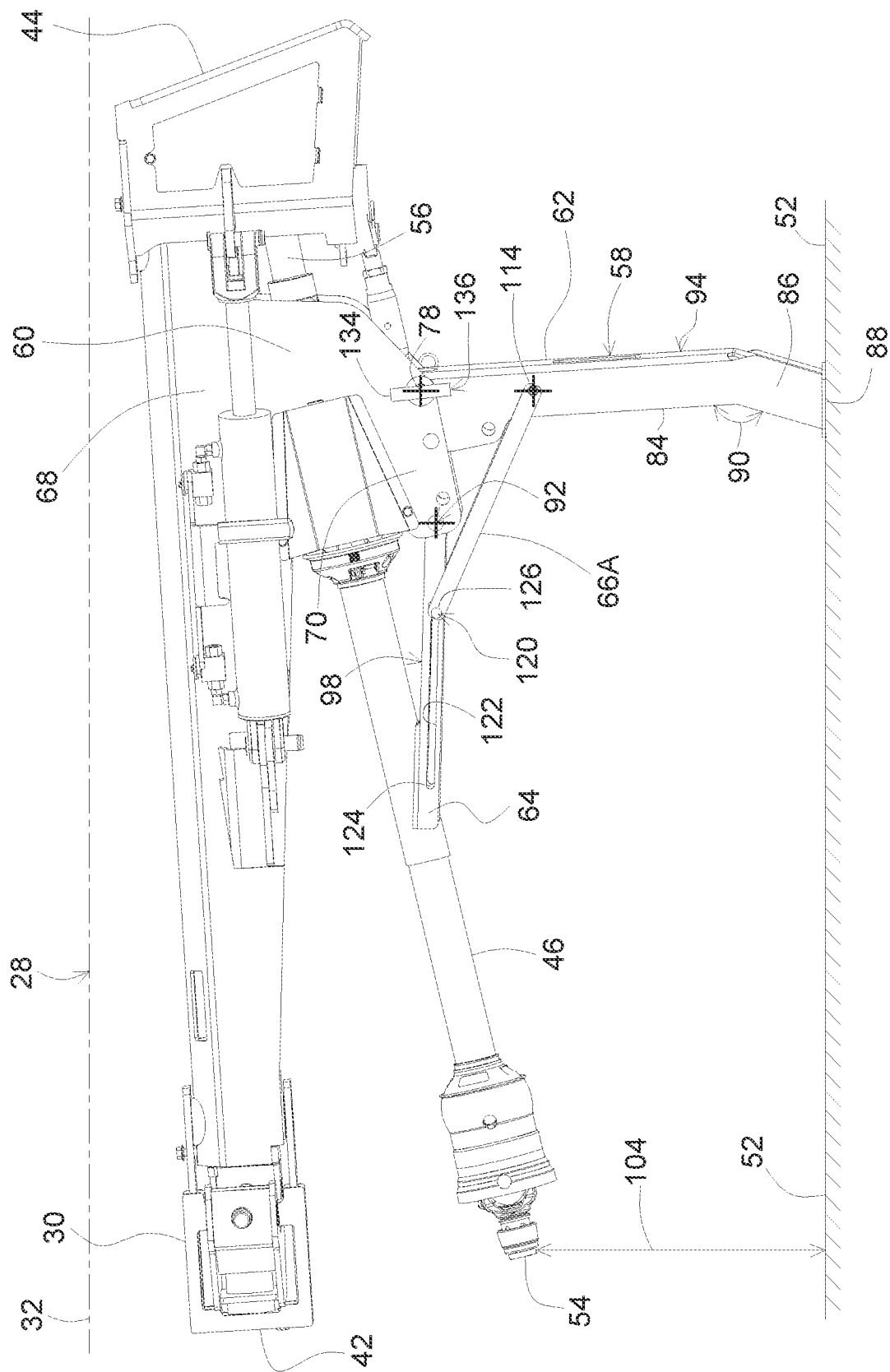
FIG. 2 is a schematic side view of a tongue of the trailered implement showing a support assembly including an implement support link in an implement support position and a shaft support link in a first support position.
Figure 3:
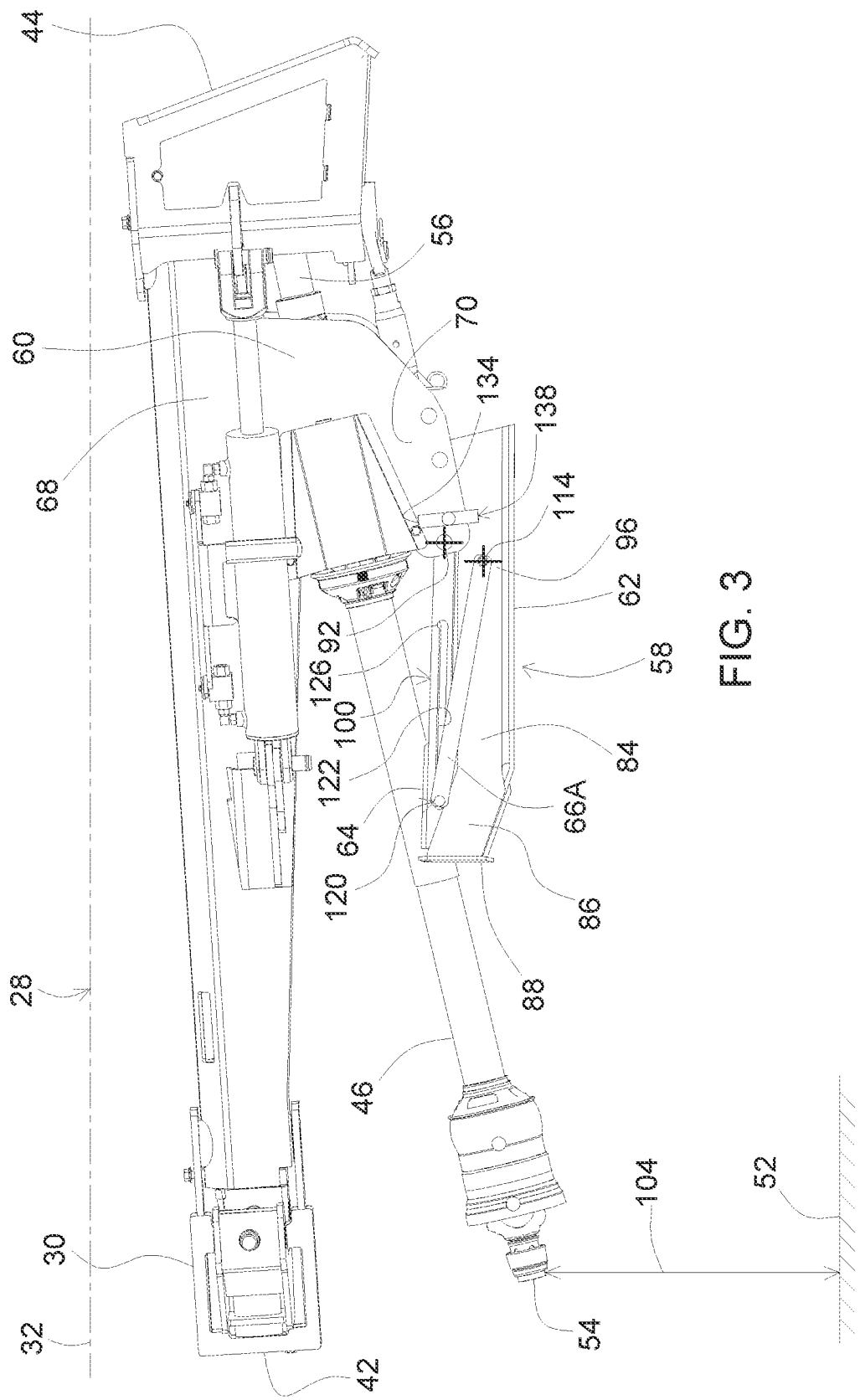
FIG. 3 is a schematic side view of the tongue showing the implement support link in a stowed position and the shaft support link in a second support position.
Figure 4:
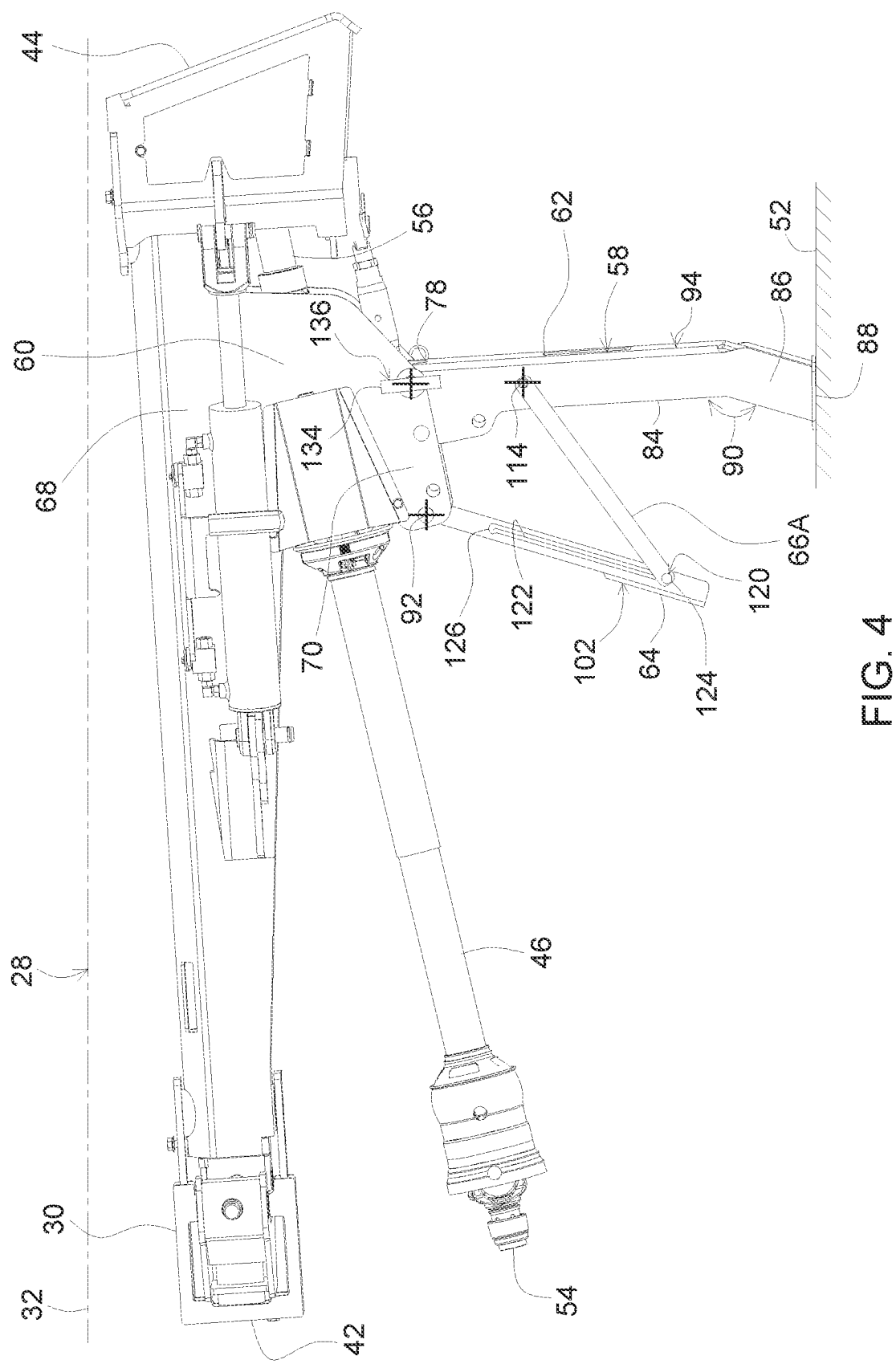
FIG. 4 is a schematic side view of the tongue showing the implement support link in the implement support position and the shaft support link in a third position.

Referring to FIGS. 2-4, the tongue 28 extends along a central longitudinal axis 32 of the frame 24. The central longitudinal axis 32 of the frame 24 may be defined as an axis that extends between a forward end 34 and a rearward end 36 of the frame 24 relative to a direction of travel 38 of the trailered implement 20, and which passes through a center of gravity 40 of the trailered implement 20. The tongue 28 may be attached to the frame 24 in any suitable manner. The tongue 28 may be fixedly attached to the frame 24, or may be attached to the frame 24 in a manner that enables rotation of the tongue 28 relative to the frame 24 about one or more axis of rotation. In the example implementation of the trailered implement 20, the tongue 28 includes a first end 42 that is configured for connection to the tow vehicle 22, and a second end 44 that is moveable attached to the frame 24.

The trailered implement 20 includes a rotatable shaft 46. The rotatable shaft 46 may be referred to as a Power Take Off (PTO) shaft. The rotatable shaft 46 is configured for connection to an output 48 of the tow vehicle 22, and is operable to transmit rotation from the output 48 of the tow vehicle 22 to a rotating element 50 of the trailered implement 20. The rotating element 50 of the trailered implement 20 may include, but is not limited to, a gearbox, a gear train, a transmission, etc. In the example implementation shown in the Figures and described herein, the tongue 28 is configured in a "high" orientation in which the tongue 28 is disposed in an elevated position above the output 48 of the tow vehicle 22 relative to a ground surface 52. The rotating shaft is positioned vertically below the tongue 28 relative to the ground surface 52, and extends generally parallel with the tongue 28 along the central longitudinal axis 32 of the frame 24. The rotating shaft includes a first end 54 that is configured for attachment to the tow vehicle 22, and a second end 56 that is attached to the rotating element 50 of the trailered implement 20. As is understood by those skilled in the art, the rotating shaft may include a pivotable connection at each of the first end 54 and the second end 56 of the rotating shaft. The pivotable connections at each respective end of the rotating shaft enable movement of the rotating shaft about multiple axis relative to the output 48 and to the rotating element 50 respectively.

The trailered implement 20 includes a support assembly 58 for at least partially supporting the trailered implement 20 and the rotating shaft when the trailered implement 20 is not connected to the tow vehicle 22. The support assembly 58 is configured to support the tongue 28 and/or the forward end 34 of the frame 24 when the trailered implement 20 is not connected to the tow vehicle 22. The support assembly 58 may position the tongue 28 with the first end 42 of the tongue 28 elevated above the ground surface 52. In one implementation, the support assembly 58 may position the tongue 28 such that the first end 42 of the tongue 28 is properly located above the ground surface 52 in a position that enables easy and/or convenient connection to the tow vehicle 22. Additionally, the support assembly 58 is configured to support the rotating shaft. For example, the support assembly 58 may position the rotating shaft such that the first end 54 of the rotating shaft is properly located above the ground surface 52 in a position that enables easy and/or convenient connection to the output 48 of the tow vehicle 22.

In the example implementation shown in the Figures and described herein, the support assembly 58 includes a four-link system coupled to the frame 24 and/or the tongue 28. The four-link system includes an attachment link 60, an implement support link 62, a shaft support link 64, and an intermediate link 66A, 66B. It should be appreciated that the support assembly 58 may be configured differently than the example implementation of the four-link system described herein. As such, the scope of the disclosure should not be limited to the example implementation of the four-link system shown in the Figures and described herein.

Referring to FIGS. 2-6, in the example implementation of the support assembly 58 shown in the Figures and described herein, the attachment link 60 is integrated into a beam structure 68 of the tongue 28. However, it should be appreciated that the attachment link 60 may be manufactured from components separate from the tongue 28 and then attached to the tongue 28 and/or the frame 24. For example, the attachment link 60 may be attached to the tongue 28 in a manner including, but not limited to, a bolted or fastened connection, or a welded connection.

Figure 6:
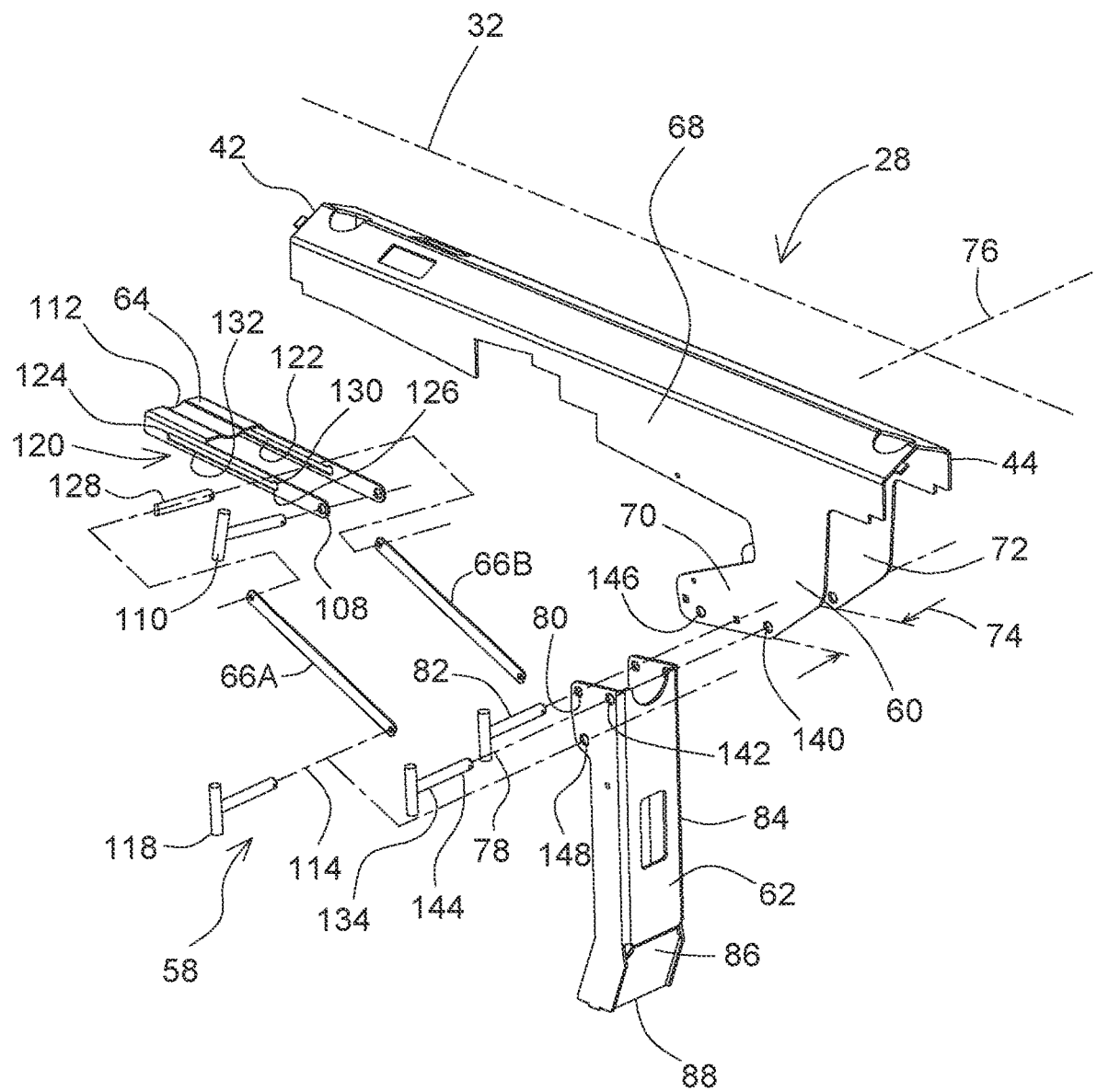
FIG. 6 is a schematic exploded perspective view of the support assembly.

Referring to FIG. 6, the example implementation of the attachment link 60 includes a pair of flanges, i.e., a first flange 70 and a second flange 72, which extend vertically downward from the beam structure 68 of the tongue 28. The first flange 70 and the second flange 72 are spaced apart by a separation distance 74 measured along a transverse axis 76 of the frame 24. The transverse axis 76 of the frame 24 extends generally perpendicular to the central longitudinal axis 32 of the frame 24, is disposed on a substantially horizontal plane, and passes through the center of gravity 40 of the frame 24.

Referring to FIGS. 2-5, the implement support link 62 is rotatably attached to the attachment link 60 for rotational movement relative to the attachment link 60 about an implement support axis 78. The implement support axis 78 is parallel with the transverse axis 76 of the frame 24. The implement support link 62 is moveable between an implement support position 94 (shown in FIGS. 2, 4 and 5) and a stowed position 96 (shown in FIGS. 1 and 3). When the implement support link 62 is disposed in the implement support position 94, such as may occur when the trailered implement 20 is not connected to the tow vehicle 22, the implement support link 62 is positioned to support the forward end 34 of the frame 24 relative to the ground surface 52. When the implement support link 62 is disposed in the stowed position 96, such as may occur when the trailered implement 20 is connected to the tow vehicle 22, the implement support link 62 is nested against the lower or bottom surface of the tongue 28 and disengaged from the ground surface 52.

Figure 5:
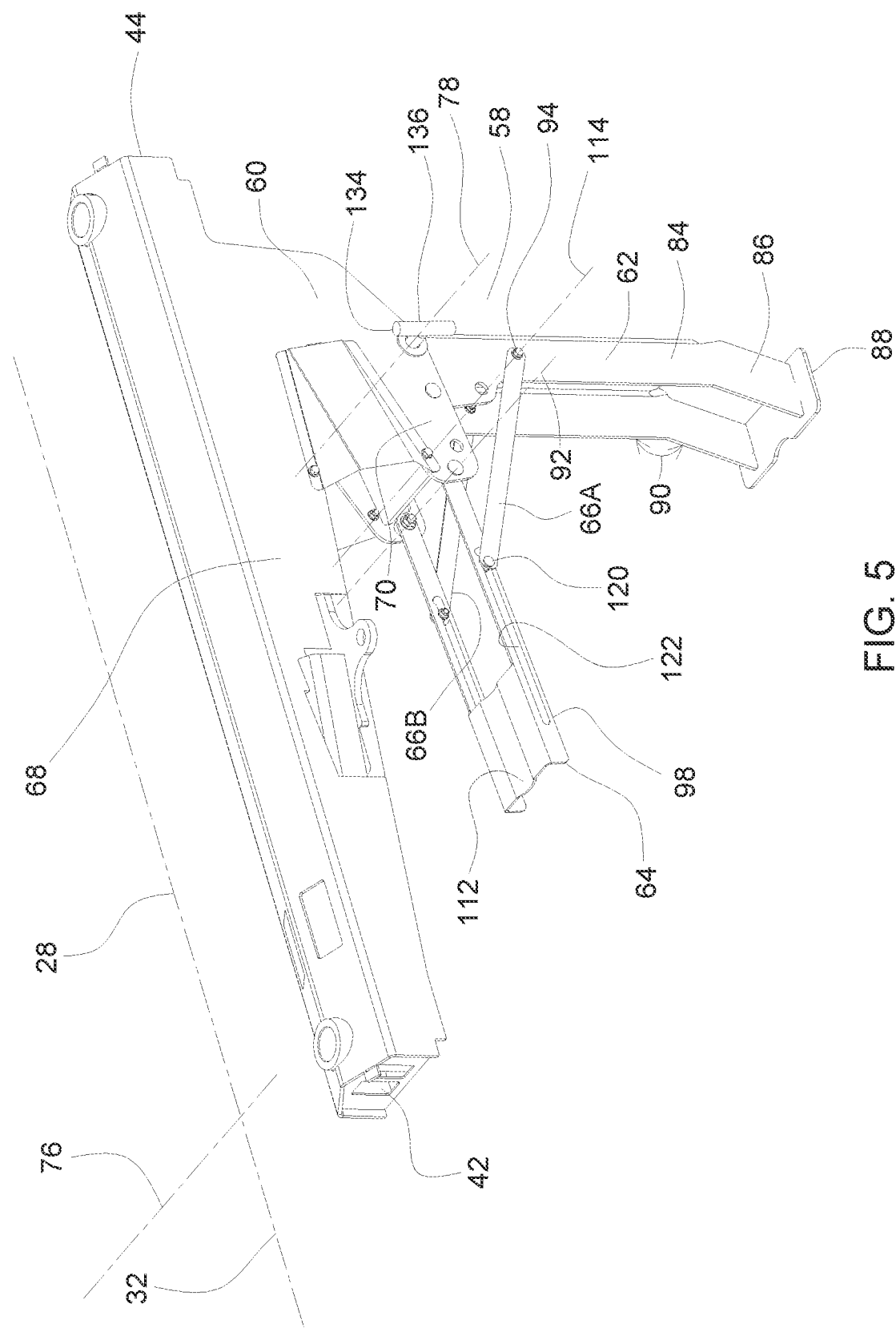
FIG. 5 is a schematic perspective view of the support assembly.

Referring to FIGS. 5 and 6, the implement support link 62 is rotatably attached to the attachment link 60. The implement support link 62 may be attached to the attachment link 60 in any manner that enables movement of the implement support link 62 relative to the attachment link 60, between the implement support position 94 and the stowed position 96. For example, the implement support link 62 and the attachment link 60 may each include one or more respective mounting apertures 80 concentric with the implement support axis 78. The implement support link 62 may be attached to the attachment link 60 via a fastener 82 extending through the respective mounting apertures 80 of the implement support link 62 and the attachment link 60.

Referring to FIGS. 2 and 3, the implement support link 62 may include a shape relative to the central longitudinal axis 32 of the frame 24. When the implement support link 62 is positioned in the stowed position 96, the shape of the implement support link 62 positions a forward end of the implement support link 62, relative to the rotating shaft, in a manner that directs material downward and away from the rotating shaft to prevent the lower and/or forward end of the implement support link 62 from snagging on an object and/or crop material. For example, the implement support link 62 may include a first portion 84 disposed proximate that attachment link 60, and a second portion 86 spaced from the attachment link 60. A foot 88 may be disposed on the distal end of the second portion 86. The foot 88 is configured for engaging the ground surface 52 when the implement support link 62 is disposed in the implement support position 94. The first portion 84 and the second portion 86 form an angle 90 therebetween that positions the foot 88 nearer the rotatable shaft 46 when the implement support link 62 is positioned in the stowed position 96. Additionally, when the implement support link 62 is disposed in the implement support position 94, the angle 90 between the first portion 84 and the second portion 86 orients the second portion 86 to deflect objects that may contact the second portion 86 downward during movement.

Referring to FIGS. 2 through 6, the shaft support link 64 is rotatably attached to the attachment link 60 for rotational movement relative to the attachment link 60 about a shaft support axis 92. The shaft support axis 92 is parallel with the transverse axis 76 of the frame 24. The shaft support link 64 is moveable between a first support position 98 (shown in FIG. 2), a second support position 100 (shown in FIG. 3), and optionally a third position 102 (shown in FIG. 4). The shaft support link 64 is positionable in the first support position 98 and optionally the third position 102 when the implement support link 62 is disposed in the implement support position 94. The first support position 98 of the shaft support link 64 is arranged to support and position the rotatable shaft 46 at a first height 104 relative to the ground surface 52 when the implement support link 62 is disposed in the implement support position 94. The shaft support link 64 is positionable in the second support position 100 when the implement support link 62 is disposed in the stowed position 96. The second support position 100 of the shaft support link 64 is arranged to support and position the rotatable shaft 46 at a second height 106 relative to the ground surface 52 when the implement support link 62 is disposed in the stowed position 96.

Referring to FIGS. 2 and 3, the first height 104 associated with the first support position 98 of the shaft support link 64 may include a higher elevation relative to the ground surface 52 than the second height 106, which is associated with the second support position 100 of the shaft support link 64. In other words, the second height 106 is lower than the first height 104. As such, when the implement support link 62 is disposed in the implement support position 94 and the shaft support link 64 is disposed in the first support position 98, the rotatable shaft 46 is supported at the first height 104, which may be defined or configured to substantially match an elevation of and/or align with the output 48 of the tow vehicle 22.

Referring to FIG. 3, when the implement support link 62 is disposed in the stowed position 96, the shaft support link 64 is disposed in the second support position 100. When the shaft support link 64 is disposed in the second support position 100, the rotatable shaft 46 may be supported by the shaft support link 64, such as shown in FIG. 3, or may be connected to the output 48 of the tow vehicle 22. The second height 106 of the second support position 100 of the shaft support link 64 may include an elevation that substantially positions the rotatable shaft 46 near the output 48, though slightly lower than the first height 104. When the rotatable shaft 46 is not supported by the shaft support link 64 at the second height 106, e.g., when the rotatable shaft 46 is connected to the output 48 of the tow vehicle 22, such as shown in FIG. 1, the second support position 100 of the shaft support link 64 provides clearance between the rotatable shaft 46 and the shaft support link 64. As such, the second support position 100 of the shaft support link 64 may support the rotatable shaft 46 when not connected to the output 48, but is also provides clearance between the shaft support link 64 and the rotatable shaft 46 when the rotatable shaft 46 is connected to the output 48.

Referring to FIGS. 5 and 6, the shaft support link 64 is rotatably attached to the attachment link 60. The shaft support link 64 may be attached to the attachment link 60 in any manner that enables movement of the shaft support link 64 relative to the attachment link 60, between the first support position 98, the second support position 100, and optionally the third position 102. For example, the shaft support link 64 and the attachment link 60 may each include one or more respective mounting apertures 108 concentric with the shaft support axis 92. The shaft support link 64 may be attached to the attachment link 60 via a fastener 110 extending through the respective mounting apertures 108 of the shaft support link 64 and the attachment link 60.

Referring to FIGS. 5 and 6, the shaft support link 64 may include a recess 112 shaped to receive and laterally support the rotatable shaft 46. For example, the recess 112 may include a generally concave, partial cylindrical surface within which the rotatable shaft 46 may partially nest along a longitudinal direction of the rotatable shaft 46. As such, when the rotatable shaft 46 is not attached to the output 48 of the tow vehicle 22 and is supported on the shaft support link 64, the nesting engagement between the shape of the recess 112 and the rotatable shaft 46 resists lateral movement of the rotatable shaft 46 along the transverse axis 76.

Referring to FIGS. 5 and 6, the intermediate link 66A, 66B interconnects the implement support link 62 and the shaft support link 64. In the example implementation shown in the Figures and described herein, the intermediate link 66A, 66B includes a first intermediate link 66A disposed on a first lateral side of the tongue 28, and a second intermediate link 66B disposed on a second lateral side of the tongue 28. The intermediate link 66A, 66B is rotatably attached to the implement support link 62 for rotation about a rotation axis 114 of the intermediate link 66A, 66B. The intermediate link 66A, 66B may be attached to the implement support link 62 in any manner that enables rotation of the intermediate link 66A, 66B relative to the implement support link 62. For example, the intermediate link 66A, 66B and the implement support link 62 may each include one or more respective mounting apertures 116 concentric with the rotation axis 114 of the intermediate link 66A, 66B. The intermediate link 66A, 66B may be attached to the implement support link 62 via a fastener 118 extending through the respective mounting apertures 116 of the intermediate link 66A, 66B and the implement support link 62.

Referring to FIGS. 2-6, the intermediate link 66A, 66B is connected to the shaft support link 64 via a slidable connection 120. The slidable connection 120 may be configured in a manner that enables a forward end of the intermediate link 66A, 66B to move along a longitudinal length of the shaft support link 64. For example, in the example implementation shown in the Figures and described herein, the shaft support link 64 defines an elongated slot 122 extending between a forward end 124 of the elongated slot 122 and a rearward end 126 of the elongated slot 122. The intermediate link 66A, 66B includes a slidable fastener 128 that is moveable within the elongated slot 122, along the longitudinal length of the elongated slot 122, i.e., between the forward end 124 and the rearward end 126 of the elongated slot 122. The slidable fastener 128 may include, but is not limited to, a shaft or pin that extends through the elongated slot 122. It should be appreciated that the slidable connection 120 between the shaft support link 64 and the intermediate link 66A, 66B may be configured differently than shown in the Figures and described herein.

As best shown in FIG. 3, the elongated slot 122 may include a notch section 130 disposed proximate the rearward end 126 of the elongated slot 122. The notch section 130 is shaped to engage the slidable fastener 128 in interlocking engagement to secure the shaft support link 64 in the first support position 98 relative to the implement support link 62. The notch section 130 is positioned on an upper vertical edge 132 of the elongated slot 122, such that gravitational forces acting on the trailered implement 20, when the trailered implement 20 is resting on the implement support link 62 in the implement support position 94, tend to urge or bias the slidable fastener 128 into interlocking engagement with the notch section 130. The slidable fastener 128 is shown engaged in interlocking engagement with the notch section 130 in FIG. 2.

Referring to FIG. 4, when the implement support link 62 is disposed in the implement support position 94, the shaft support link 64 may be positionable in the third position 102. The third position 102 of the shaft support link 64 includes the shaft support link 64 being angle 90d downward and away from the rotatable shaft 46 with the slidable fastener 128 positioned proximate the forward end 124 of the elongated slot 122. The third position 102 provides access to the second end 56 of the rotatable shape.

Referring to FIGS. 2 and 3, the support assembly 58 may further include a latch 134 that is moveable between a first latch position 136 and a second latch position 138. The first latch position 136 secures the implement support link 62 relative to the tongue 28 in the implement support position 94. The second latch position 138 secures the implement support link 62 relative to the tongue 28 in the stowed position 96. The latch 134 may be configured in any manner capable of selectively supporting the implement support link 62 in the implement support position 94 when in the first latch position 136, and in the stowed position 96 when in the second latch position 138.

Referring to FIG. 6, in the example implementation shown in the Figures and described herein, the attachment link 60 defines a first attachment bore 140 and the implement support link 62 includes a first support bore 142. As shown in FIGS. 2 and 5, the first attachment bore 140 and the first support bore 142 are aligned with each other when the implement support link 62 is disposed in the implement support position 94. The latch 134 includes a latch pin 144. The latch pin 144 is simultaneously positionable within the first attachment bore 140 and the first support bore 142 to secure the implement support link 62 relative to the tongue 28 in the implement support position 94. Additionally, referring to FIG. 6, the attachment link 60 may define a second attachment bore 146 and the implement support link 62 may define a second support bore 148. As shown in FIG. 3, the second attachment bore 146 and the second support bore 148 are aligned with each other when the implement support link 62 is disposed in the stowed position 96. The latch pin 144 is simultaneously positionable within the second attachment bore 146 and the second support bore 148 to secure the implement support relative to the tongue 28 in the stowed position 96. It should be appreciated that the latch 134 may differ from the example implementation shown in the Figures and described herein.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A support assembly for a trailered implement having a tongue and a rotatable shaft positioned vertically below the tongue, the support assembly comprising:
   an implement support link moveable between an implement support position and a stowed position;
   a shaft support link coupled to the implement support link and moveable between a first support position and a second support position;
   wherein the shaft support link is disposed in the first support position when the implement support link is disposed in the implement support position to support and position the rotatable shaft at a first height relative to a ground surface;
   wherein the shaft support link is disposed in the second support position when the implement support link is disposed in the stowed position;
   an intermediate link interconnecting the implement support link and the shaft support link; and
   wherein the shaft support link defines an elongated slot extending between a forward end of the elongated slot and a rearward end of the elongated slot, and wherein the intermediate link includes a slidable fastener moveable within the elongated slot.

2. The support assembly set forth in claim 1, further comprising an attachment link configured for attachment to the tongue of the trailered implement.

3. The support assembly set forth in claim 2, wherein the implement support link is rotatably attached to the attachment link for rotation between the stowed position and the implement support position about an implement support axis.

4. The support assembly set forth in claim 2, wherein the shaft support link is rotatably attached to the attachment link for rotation between the first support position and the second support position about a shaft support axis.

5. The support assembly set forth in claim 1, wherein the elongated slot includes a notch section disposed proximate the rearward end of the elongated slot and shaped to engage the slidable fastener in interlocking engagement to secure the shaft support link in the first support position relative to the implement support link when the implement support link is disposed in the implement support position.

6. The support assembly set forth in claim 1, wherein the slidable fastener includes a shaft extending through the elongated slot.

7. The support assembly set forth in claim 1, wherein the intermediate link is rotatably attached to the implement support link for rotation about a rotation axis of the intermediate link.

8. The support assembly set forth in claim 1, wherein the shaft support link is configured to support and position the rotatable shaft at a second height relative to the ground surface when the shaft support link is disposed in the second support position.

9. The support assembly set forth in claim 8, wherein the first height includes a higher elevation relative to the ground surface than the second height.

10. The support assembly set forth in claim 1, further comprising a latch moveable between a first latch position for securing the implement support link relative to the tongue in the implement support position, and a second latch position for securing the implement support link relative to the tongue in the stowed position.

11. The support assembly set forth in claim 1, wherein the shaft support link includes a recess shaped to receive the rotatable shaft.

12. The support assembly set forth in claim 1, wherein the rotatable shaft is a Power Take Off (PTO) shaft.

13. A trailered implement comprising:
   a frame supporting at least one ground engaging element;
   a tongue attached to the frame and having a hitch arrangement configured for attachment to a vehicle, wherein the tongue includes an attachment link;
   a rotatable shaft operable to transmit a rotational input, wherein the rotatable shaft includes a first end configured for attachment to an output of the vehicle at an elevation disposed vertically below the hitch arrangement;
   an implement support link rotatably attached to the attachment link for rotational movement between an implement support position and a stowed position about an implement support axis;
   a shaft support link rotatably attached to the attachment link for rotational movement between a first support position and a second support position about a shaft support axis;
   wherein the shaft support link is positionable in the first support position when the implement support link is disposed in the implement support position to support and position the rotatable shaft at a first height relative to a ground surface, whereby the first end of the rotatable shaft is positioned at an elevation vertically below the hitch arrangement when at the first height; and wherein the shaft support link is positionable in the second support position when the implement support link is disposed in the stowed position to support and position the rotatable shaft at a second height relative to the ground surface.

14. The trailered implement set forth in claim 13, further comprising an intermediate link interconnecting the implement support link and the shaft support link.

15. The trailered implement set forth in claim 14, wherein the shaft support link defines an elongated slot extending between a forward end of the elongated slot and a rearward end of the elongated slot, and wherein the intermediate link includes a slidable fastener moveable within the elongated slot.

16. The trailered implement set forth in claim 15, wherein the elongated slot includes a notch section disposed proximate the rearward end of the elongated slot and shaped to engage the slidable fastener in interlocking engagement to secure the shaft support link in the first support position when the implement support link is disposed in the implement support position.

17. The trailered implement set forth in claim 15, wherein the shaft support link is positionable in a third position when the implement support link is disposed in the implement support position, wherein the third position of the shaft support link includes the shaft support link being angled downward and away from the rotatable shaft with the slidable fastener positioned proximate the forward end of the elongated slot.

18. The trailered implement set forth in claim 14, wherein the intermediate link is rotatably attached to the implement support link for rotation about a rotation axis of the intermediate link.

19. The trailered implement set forth in claim 13, wherein the first height includes a higher elevation relative to the ground surface than the second height.

20. The trailered implement set forth in claim 13, further comprising a latch moveable between a first latch position for securing the implement support link relative to the tongue in the implement support position, and a second latch position for securing the implement support link relative to the tongue in the stowed position.

21. The trailered implement set forth in claim 20, wherein the attachment link defines a first attachment bore and the implement support link includes a first support bore, wherein the first attachment bore and the first support bore are aligned with each other when the implement support link is disposed in the implement support position, and with the latch simultaneously positionable within the first attachment bore and the first support bore to secure the implement support link relative to the tongue in the implement support position.

22. The trailered implement set forth in claim 20, wherein the attachment link defines a second attachment bore and the implement support link includes a second support bore, wherein the second attachment bore and the second support bore are aligned with each other when the implement support link is disposed in the stowed position, and with the latch simultaneously positionable within the second attachment bore and the second support bore to secure the implement support relative to the tongue in the stowed position.

23. The trailered implement set forth in claim 13, wherein the implement support link includes a first portion and a second portion having a foot configured for engaging the ground surface, wherein the first portion and the second portion form an angle therebetween to position the foot nearer the rotatable shaft when the implement support link is positioned in the stowed position.

* * * * *